(12) United States Patent
Crespin et al.

(10) Patent No.: US 6,805,171 B2
(45) Date of Patent: Oct. 19, 2004

(54) METHOD FOR LOADING A CHAMBER WITH SOLID PARTICLES

(75) Inventors: Pierre Crespin, Le Havre (FR); Daniel Barthod, Honfleur (FR); Emmanuelle Petitjean, Saint Avold (FR); Marc Lebouteiller, Le Havre (FR)

(73) Assignee: Total Fina Elf France, Puteaux (FR)

( * ) Notice: Subject to any disclaimer, the term of this patent is extended or adjusted under 35 U.S.C. 154(b) by 0 days.

(21) Appl. No.: 10/451,176

(22) PCT Filed: Dec. 20, 2001

(86) PCT No.: PCT/FR01/04091

§ 371 (c)(1),
(2), (4) Date: Dec. 29, 2003

(87) PCT Pub. No.: WO02/49749

PCT Pub. Date: Jun. 27, 2002

(65) Prior Publication Data

US 2004/0129335 A1 Jul. 8, 2004

(30) Foreign Application Priority Data

Dec. 20, 2000 (FR) .............................. 00/16698

(51) Int. Cl.$^7$ ................................................ B65B 1/20
(52) U.S. Cl. ............................... 141/11; 141/1; 141/69
(58) Field of Search .................................. 141/1, 11, 12, 141/69, 73, 98; 53/111 R, 113, 111 RC; 366/318, 332

(56) References Cited

U.S. PATENT DOCUMENTS 6,467,513 B1 * 10/2002 Yanaru et al. ................ 141/12

* cited by examiner

*Primary Examiner*—Timothy L. Maust
(74) *Attorney, Agent, or Firm*—Sughrue Mion, PLLC

(57) ABSTRACT

A method wherein the particles are homogeneously distributed like rain to constitute a horizontal bed of particles on the entire section of the chamber (1). The invention is characterised in that it consists in temporarily modifying at least once the loading conditions, so that the profile of the surface (8) of the bed of particles forms, at least at the periphery thereof, an angle α with the horizontal ranging between 6° and 25°, preferably, between 10° and 20°, and in subsequently restoring the loading conditions to obtain a horizontal bed.

13 Claims, 1 Drawing Sheet

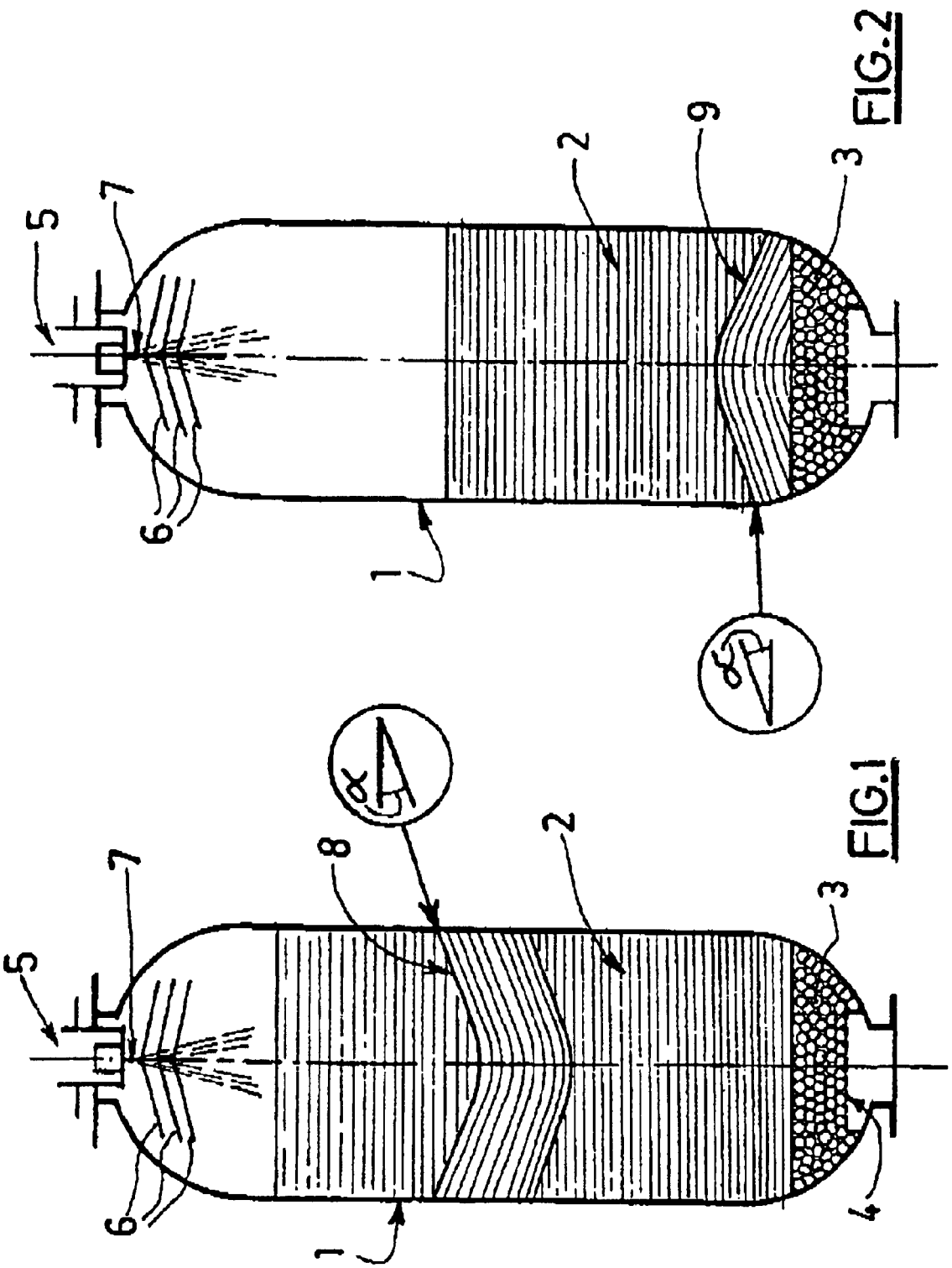

METHOD FOR LOADING A CHAMBER WITH SOLID PARTICLES

The present invention concerns a new method of loading solid particles in an enclosure, making it possible to obtain a better distribution of a fluid between the loaded particles.

This process more particularly concerns the loading of fixed-bed reactors of the chemical or electrochemical, petroleum or petrochemical type, with solid particles in divided condition, that can be in the form of beads, grains, cylinders, pellets, rods, or any other form, but of relatively small dimensions. In particular, the particles can be from molecular sieves or grains from solid catalysts, generally extruded, produced either in irregular shape or in mono- or multi-lobe shape, the dimensions of which vary, depending on the case, from a few tens of millimeters to a few centimeters.

It is this application that will be referred to more particularly in the following description, but the method according to the invention applies to the loading of any other type of solid particles in an enclosure.

It is known that the method of loading a reactor that consists of pouring the catalyst by means of a flexible conduit, called "sleeve" or "sock" ("sock loading"), or by using buckets filled with catalyst, produces heterogeneous loading which results in an incomplete chemical reaction and an apparent deactivation of the catalytic mass.

To remedy this disadvantage, and more particularly to increase the homogeneity and density of the catalytic bed, it is also known that the catalyst grains can be loaded by sprinkling in order to obtain the most uniform distribution possible, preferably with a horizontal orientation of the grains, over the entire transverse section of the enclosure to be loaded, as described in U.S. Pat. No. 3,804,273, or U.S. Pat. No. 4,051,019. Other types of equipment have also been proposed for obtaining an overall homogeneous distribution of the whole surface of the bed to be loaded, for example in FR-A-2,319,427.

The Applicant has patented a method and a device for the uniform distribution of a solid in divided form in an enclosure, which are covered by EP-A-007,854 and EP-A-116,246, as well as EP-A-769,462.

All of these loading methods, which are grouped under the name "dense loadings," result in a very significant improvement in the homogeneity of the catalytic mass by decreasing, and even eliminating, the random spaces between the grains that are observed in sock-type loading.

More particularly, the present invention concerns methods of loading by rain-effect, particularly those methods that the Applicant has described in the above-mentioned European patent applications, and more particularly, in EP-A-769,462, known by the name DENSICAT, and which lend themselves to precise adjustments of the distribution of the grains inside an enclosure.

One such device, comprised essentially of a rotating metering device, is placed at the upper part of the reactor beneath the manhole through which the catalyst is poured, for example by a feed hopper. While falling, the grains of catalyst strike rotating deflectors, bouncing laterally off of them to be distributed like raindrops, homogeneously, over the entire transverse section of the reactor. One of the most important parameters to control to obtain a uniform rain-effect is the speed of rotation of the moving element of the meter.

This loading technique, which is completely controlled by the operators, has been successfully used in a large number of chemical reactors, particularly reactors for hydrorefining hydrocarbons, for which reactors it is essential to obtain a dense, homogeneous distribution of the catalyst grains. Indeed, the molecules comprising the liquid load to be treated must have the same probability, at any point of the bed, of encountering the same large number of grains of catalysts, with no spaces randomly distributed between said grains, that is, with no preferential paths that the reaction liquid could take at the expense of an effective and complete chemical reaction.

In pursuing her work on methods of loading catalysts by rain-effect in a reactor operating in bi-phase mode, such as liquid and gas, by co-current or counter-current, the Applicant has confirmed that, in spite of the, preferably horizontal orientation of the grains that is obtained by rain-effect distribution, a new phenomenon appeared, unrelated to the disadvantages previously cited for sock loading and resulting in poor homogeneity of distribution of the reaction liquid within the catalytic mass. In fact, and more particularly in the case of loads of reactors that are quite high, especially when this height is more than twice its diameter, the so-called "wall" effects tend to lead the liquid toward the internal wall of the reactor, thus creating new preferential paths that route the liquid at the expense of the catalytic mass as a whole.

This phenomenon, which produces local variations of apparent porosity of the catalytic bed, which porosity becomes maximum in contact with a surface, was determined by H. KOYAMA et al., Oil and Gas Journal, Nov. 13, 1995, p. 82, and appears to a greater or lesser degree regardless of the precise shape and dimensions of the catalyst grains. In the more unfavorable cases, the reaction liquid is caught in the most porous area, that is, near the inner wall of the reactor, and accelerates under the effect of gravity. Moreover, since the concentration of gas is lower in this area of the reactor, there is a strong possibility that the risk of coking along the wall will increase. Hot points also appear in the catalytic mass that is poorly irrigated by the reaction liquid, leading to an instability of the reactor that can result in the deactivation of the catalyst. Additional effects due to poor distribution of the liquid on the upper part of the catalytic bed or, more specifically, the presence of a filter screen at the outlet of the reactor, also disturb the distribution of the liquid in the catalytic mass.

All of these disadvantages, therefore, have a negative impact on the yield of the reaction and on the working life of the catalyst, resulting in consequences that can be significant with respect to the equipment and the quality of the manufactured products, and which therefore become seriously detrimental for the operator. This becomes all the more limiting as the strictness of the specifications increases, and particularly the reduction of sulfur content in gasoils, involves the optimization of the hydrodynamics of the desulfuration reactors.

The present invention seeks to remedy these serious operational disadvantages by temporarily modifying the loading conditions of this reactor, during the process of loading said reactor by rain-effect with the particles of the catalyst, so as to compensate, by appropriate modifications of the profile of the catalytic bed being formed, for the local variations of apparent porosity of the catalytic bed, and therefore to modify the flow conditions of the reaction liquid in the catalytic bed, in order to produce a better distribution of the flow of this liquid within the catalytic mass.

Consequently, an object of the invention is a method of loading an enclosure with solid particles, particularly a chemical reactor with particles of catalyst, for the purpose of improving the flow of a liquid between these particles during the operation of the reactor, in which the particles are distributed homogeneously like rainfall to establish a horizontal bed of particles over the whole section of said enclosure, this method being characterized in that during the loading, the loading conditions are temporarily modified at least one time so that the profile of the surface of the bed of particles forms, at least at the periphery thereof, an angle α with the horizontal of between 6° and 25°, and preferably between 10° and 20°, and in that the loading conditions are then reinstated in order to obtain a horizontal bed.

After a normal start of the loading process, that is, to form a bed in which the solid particles are preferably distributed horizontally, the operator modifies the loading conditions at least one time in order to obtain a new profile of the surface of the bed of particles, preferably when the height of said bed remaining to be loaded is between 0.75 and 2.5 times the diameter of the reactor, and even more preferably between 1 and 2 times this diameter. In effect, it is by temporarily modifying the loading conditions so that the profile of the surface of the bed of particles makes, at least at the periphery thereof, a negative angle with the horizontal in order to obtain a concave loading profile, that is, a profile that slopes the surface of the catalytic bed being formed, from the wall of the enclosure toward the interior thereof, in order to form a depression in the central part of the surface of the catalytic bed, so that the reaction liquid can be redirected toward the center of the catalytic mass, thus minimizing the effects of preferential flows due to the wall of the reactor.

According to the present invention, the operator can also correct the effects of aspiration due to the filter screen located at the outlet of the reactor, generally along the longitudinal axis of said reactor. Indeed, it is known that the presence of a filter screen at the outlet of a reactor, which filter screen is composed of a plate perforated with a plurality of holes that can be of diameters that are different from each other, prompts the reaction liquid to use the preferential paths, i.e., the shortest paths to the filter screen, at the expense of the surrounding catalytic mass. By giving the surface of the bed of particles a profile making a positive angle with the horizontal, at least at the periphery thereof, that is, a convex type loading profile with the surface of the bed of particles sloped toward the bottom of the enclosure near the wall thereof, so as to form a dome in the central part of the surface of the catalytic bed, the liquid can be redirected toward the grains of catalysts that are outermost with reference to the longitudinal axis of the reactor, thus allowing a more homogeneous circulation of the reaction liquid in the entire mass of the catalytic bed.

Preferably, the modification of the loading conditions in order to obtain a convex profile of the surface of the catalytic bed occurs when the loading height of the bed of particles is less than 0.5 times the diameter of the reactor, and even more preferably less than 0.2 times said diameter.

Irrespective of the shape of the loading profile adopted during the temporary modification of the loading conditions, the settings of the process conditions of the rain-effect distribution device for the catalyst grains on the transverse section of the enclosure are selected so that the angle formed between the axis of the slope of the surface of the bed of particles and the horizontal, whether said angle is positive or negative, is between 6° and 25°, and preferably between 10° and 20°.

A loading profile resulting both from concave and convex loading can also be obtained with specific adjustments of the moving device that provides the rain-effect distribution of the catalyst grains.

Predetermined locations of the surface of the bed of particles being formed, to which a temporary modification of the loading conditions can also be applied, can be moved off center with reference to the longitudinal axis of the reactor or composed of at least a portion of the surface of the bed, such as a ring, or parts of this surface contiguous with the inner face of the wall or walls of the enclosure, where it is desired to form a profile sloped from said walls toward the interior of the enclosure or vice versa.

After these temporary modifications of the loading conditions, the initial settings of the device for the homogenous distribution of catalyst grains by rain-effect are reinstated to obtain a horizontal profile of said catalytic bed.

All of the rain-effect modes of loading implemented in the standard way, that is, for which the grain distribution device allows a homogeneous distribution over the entire transverse section of the reactor or enclosure to be charged, can be used according to the invention.

A particularly preferred rain-effect loading mode uses a rotary distribution device placed beneath a feed system for particles of the enclosure, the speed of rotation of which is an adjustable parameter. Preferably, the device comprises flexible deflectors suspended from a shaft capable of rotation and which are articulated on said shaft so as to rise under the effect of centrifugal force. This technique is perfectly controllable by the operators and lends itself with no difficulty whatever to precise temporary modifications of the loading conditions, at predetermined locations of the height of the catalytic bed in the process of being formed, in order to modify the profile of the surface of said catalytic bed.

With this preferred mode of loading, a convex profile of the catalytic bed being loaded can be obtained by decreasing the speed of rotation of the rotating element of the Densicat device, while a concave profile is obtained by increasing this speed of rotation, with reference to the nominal required speed normally used to obtain a horizontal loading profile.

The modification of the loading conditions for the enclosure, in order to locally vary the profile of the surface of the bed of particles in process of formation, can occur one or more times when the level of the bed of loaded particles in this enclosure reaches a predetermined level in the column.

One form of implementation of the invention will now be described by way of example, with reference to the appended diagrammatic drawings.

In these drawings:

FIG. 1 is a vertical cross section of a chemical reactor being loaded with catalyst particles, illustrating a first type of temporary local modification of the surface of the catalytic bed;

FIG. 2 is a view similar to FIG. 1, illustrating another type of temporary local modification of the surface of the catalytic bed.

FIG. 1 represents an enclosure 1, for example a chemical reactor, the diameter and height of which can reach several meters. In this FIG. 1, the catalytic bed 2, the weight of which is supported in the reactor 1 by inert beads 3, which beads are placed above the reactor's outlet filter screen 4, is in the process of being loaded. The catalyst grains are continuously fed into the upper part of the reactor, for example by a feed hopper 5; they then fall onto a rainfall distribution device that makes it possible to obtain a homogeneous distribution of these grains in the reactor 1.

The device represented and used in a preferred way bears the commercial name "DENSICAT." It is described in detail in EP-A-769,462. This device comprises flexible deflectors 6, made here of rubber strips, integral at various levels with a movable shaft 7, the speed of rotation of which can vary under control, in order to adjust the loading profile. The higher the speed of rotation of the deflectors 6, the farther they lift away from the movable shaft 7. This speed can reach more than one hundred revolutions per minute. The catalyst grains, after they fall onto these rotating deflectors, are distributed like rain in the gaseous phase over the entire transverse section of the reactor 1, on top of the bed 2 being formed.

This type of chemical reactor 1 is generally used to cause a liquid load to react, for example a load of hydrocarbons usually flowing from top to bottom, with a gas such as hydrogen, circulating co-currently from top to bottom, and it is therefore important that the reaction fluids or a portion thereof, particularly the liquid, do not adopt preferential paths in the catalytic bed at the expense of a complete chemical reaction, resulting in a negative impact on the working life of the catalyst and on the yield of the reaction.

In a densely loaded reactor of this type, that is, with catalyst grains preferably distributed horizontally, it is known that the apparent porosity of the catalyst becomes maximal in contact with the inner wall of the reactor and that the liquid preferentially traverses the paths thus created, then experiencing an acceleration of the speed of flow due to the height of the catalytic bed thus traversed. The distribution of the liquid in the catalytic bed is disturbed, with greater flows in contact with the reactor's walls, resulting in an incomplete chemical reaction.

According to the invention, this variation in homogeneity is compensated for by temporarily increasing the speed of rotation of the Densicat rotating device so that the profile of the surface 8 of the bed of particles at least at the periphery of said surface makes a negative angle $\alpha$ with the horizontal of between 6° and 25° and preferably between 10° and 20°, in order to redistribute the liquid toward the longitudinal axis of the catalytic mass. This modification of the loading conditions preferably occurs when the height of the catalytic bed remaining to be loaded is between 0.75 and 2.5 times the diameter of the reactor, and preferably between 1 and 2 times said diameter.

Thus, in the case of FIG. 1, after a first portion of a horizontal dense load is obtained with a speed of rotation of the rotating metering device of 80 revolutions per minute, for example, a preferential flow effect of the reaction liquid in the area of the walls of the reactor is compensated for by a temporarily increased deposit of catalyst grains in these areas, intended to obtain a concave profile of the surface of the catalytic bed, achieved by increasing the speed of rotation of the Densicat device to 120 revolutions per minute, for example.

Depending on the needs, as shown in FIG. 2, where the units already described are designated by the same reference numbers, the loading conditions of the reactor 1 can also be modified by causing a temporary decrease in the load near the walls, so that the profile of the surface of the catalytic bed 9 makes at least at the periphery of said surface a positive angle $\alpha$ with the horizontal of between 6° and 25° and preferably between 10° and 20°. This type of modification of the loading conditions of the catalyst grains, no longer to obtain a horizontal profile of the catalytic bed but rather to promote a convex profile 9, is preferably used to prevent the effect of the filter screen described above. In general, this convex loading profile is achieved by decreasing the speed of rotation of the Densicat rotating metering device, for example to 50 revolutions per minute, as soon as the loading of the first catalyst grains near the filter screen, or when the height of loading of the catalytic bed is less than 0.5 times the diameter of the reactor, and preferably 0.2 times said diameter.

Of course, these different modifications of the loading profile can take place only once during the loading, but also sequentially during the same loading of the same reactor, or they can also be done successively in order to obtain the same profile by combining the concave and convex shapes.

In general, the height of the non-horizontal portion of the loaded catalytic bed, that is, the portion loaded under special conditions, is between 0.2 and 0.5 times the height of the reactor, and preferably between 0.3 and 0.4 times said height.

Although these modifications result in a symmetrical profile of the surface of the catalytic bed with reference to the horizontal axis, they, can also, by a special application and by making use of the special adaptations of the Densicat device, be off-centered and produced with a peak or hollow that is off of the longitudinal axis.

The following example illustrates one non-limiting form of implementation of the invention.

EXAMPLE

Three series of tests of dense loading of catalyst grains with the Densicat process, as described in patent EP-A-769, 462 (references 1, 2 and 3 in the Table below) were performed in the laboratory with the same catalyst, in a stainless steel column of the following dimensions:

diameter: 0.4 m, column height: 2.0 m.

The bottom of the column was compartmentalized into 3 distinct concentric areas of the same surface area, distributed, starting from the position of the axis of the column, as "Center," "Middle" and "Outer" in the Table below. These three areas allow the selective collection of most of the liquid introduced at the top of the column.

The catalyst used for the tests is primarily comprised of aluminum oxide in dry trilobal extruded form the average dimensions of which are as follows:

equivalent diameter: 1.6 mm length: 3.7 mm.

For each of the tests, the water that simulates the reaction liquid is introduced homogeneously at the top of the reactor, above the catalytic bed. The tests were performed with new catalyst.

Test 1

The catalyst is loaded in the standard way with a Densicat type machine, that is, with a preferably horizontal orientation of the catalyst grains, to a height of 2.0 meters. The speed of rotation of the Densicat machine is 60 RPM for this test.

Test 2

This test comprises three loading stages:

1. The same new catalyst as in Test 1 is loaded under the conditions of that test, up to a loading height of 1.2 meters.

2. The catalyst is then loaded according to the invention in order to obtain a concave profile of the catalytic bed at a height of 0.4 m, measured at the center of the surface of the catalytic bed.

In order to obtain this result, and particularly a negative angle of the profile of the catalytic bed with the horizontal of between 10° and 20°, the speed of rotation of the Densicat machine is 78 RPM.

3. The end of the loading of the column up to a height of 2.0 m is performed in accordance with the conditions adopted for Test 1, in order to obtain a horizontal loading profile.

Test 3

This test is composed of the following four loading steps:
1. The catalyst is loaded so that the profile of the catalytic bed is convex in shape with a height of 0.3 m, measured at the center of the surface of the catalytic bed.

The speed of rotation of the Densicat machine is 45 RPM to obtain this type of profile and an angle with the horizontal of between 10° and 20°.

2. The catalyst is then loaded according to steps 1 to 3 of Test 2, up to the total height of load of the column.

The results are shown in the following Table:

| Samples taken from | Test | | |
|---|---|---|---|
| | 1 | 2 | 3 |
| | % of liquid collected | | |
| Center | 32.0 | 36.2 | 33.0 |
| Middle | 21.2 | 35.5 | 36.5 |
| Outside | 46.8 | 28.3 | 30.5 |
| Maximum divergence | 25.6 | 7.9 | 6.0 |

It is evident that a standard rain-effect dense loading (Test 1) does not make it possible to obtain a perfectly uniform distribution of the liquid at the outlet of the reactor. Indeed, the liquid undergoes the wall effect, that is, it follows the preferential paths located along the inner wall of the reactor, at the expense of the rest of the catalytic mass.

In order to remedy this disadvantage, and according to the invention, a temporary loading that makes it possible to obtain a concave profile of said catalytic bed during formation (Test 2), allows the reorientation of the distribution of the flow of liquid inside the bed.

In order to perfect this distribution, a second specific temporary loading, but convex (Test 3), makes it possible to obtain an improved distribution of the flow of liquid at the output of the reactor.

It will be noted that the method according to the invention does not require any auxiliary equipment for its application, and that it can be implemented in a particularly simple way, by using rain-effect loading devices of the DENSICAT type of the former technology.

What is claimed is:

1. Method of loading an enclosure (1) with solid particles, particularly a chemical reactor with particles of catalyst, for the purpose of improving the flow of a liquid between these particles during the operation of the reactor, in which the particles are distributed homogeneously like rainfall to establish a horizontal bed of particles over the whole section of said enclosure, this method being characterized in that during the loading, the loading conditions are temporarily modified at least one time so that the profile of the surface (8, 9) of the bed of particles forms, at least at the periphery thereof, an angle α with the horizontal of between 6° and 25°, and preferably between 10° and 20°, and in that the loading conditions are then reinstated in order to obtain a horizontal bed.

2. Method according to claim 1, characterized in that the value of this angle α is positive or negative depending on the temporary operating conditions adopted for loading the solid particles into the enclosure (1).

3. Method according to either of claims 1 and 2, characterized in that the temporary modification of the loading condition to obtain a negative angle α occurs when the height of the bed of particles remaining to be loaded (2) in the enclosure (1) is between 0.75 or 2.5 times the diameter of the enclosure (1), and preferably between 1 and 2 times said diameter.

4. Method according to either of claim 1 or 2, characterized in that the temporary modification of the loading conditions to obtain a positive angle α occurs when the height of the bed of particles remaining to be loaded (2) in the enclosure (1) is less than 0.5 times the diameter of the enclosure (1), and preferably less than 0.2 times said diameter.

5. Method according to any one of claims 1 to 4, characterized in that the height of the bed of particles loaded under temporary modifications of the loading conditions is between 0.2 and 0.5 times the height of the enclosure (1), and preferably between 0.3 and 0.4 times said height.

6. Method according to any one of claims 1 to 5, characterized in that the temporary modification of the loading conditions takes place more than once during the filling of the enclosure (1).

7. Method according to any one of claims 1 to 6, characterized in that the different types of temporary modifications of the loading conditions are associated in order to obtain a single specific profile of the bed of particles in process of being loaded.

8. Method according to any of claims 1 to 7, characterized in that the rain-effect loading of the enclosure (1) is achieved by means of a rotary distribution device placed beneath the enclosure's (1) particle feed system.

9. Method according to claim 8, characterized in that the rotary distribution device comprises flexible deflectors (6) suspended from a shaft (7) that can rotate, which deflectors are articulated on said axis so as to lift away from the shaft under the effect of centrifugal force.

10. Method according to either of claim 8 or 9, characterized in that the shaft (7) of the distribution device is driven in rotation at a speed of less than 120 RPM, and preferably less than 100 RPM.

11. Method according to any one of claims 9 and 10, characterized in that the profile of the bed of particles (2) in the process of being loaded is modified by varying the speed of rotation of the distribution device.

12. Method according to any one of claims 1 to 11, characterized in that the temporary modifications of the loading profile involve at least a portion of the surface of the bed of particles (2).

13. Method according to any one of claims 1 to 12, characterized in that the temporary modifications of the loading profile of the bed of particles are offset with reference to the longitudinal axis of the reactor.

* * * * *